Patented Jan. 6, 1925.

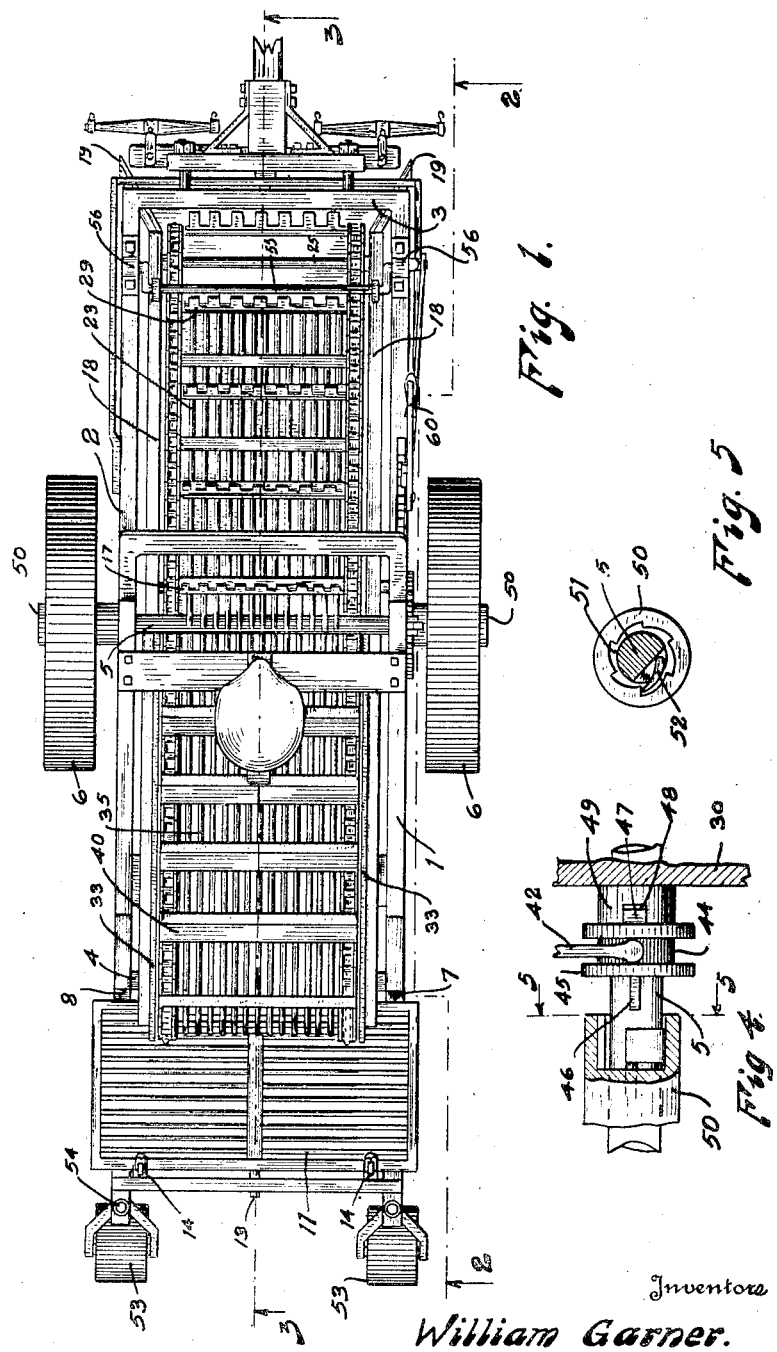

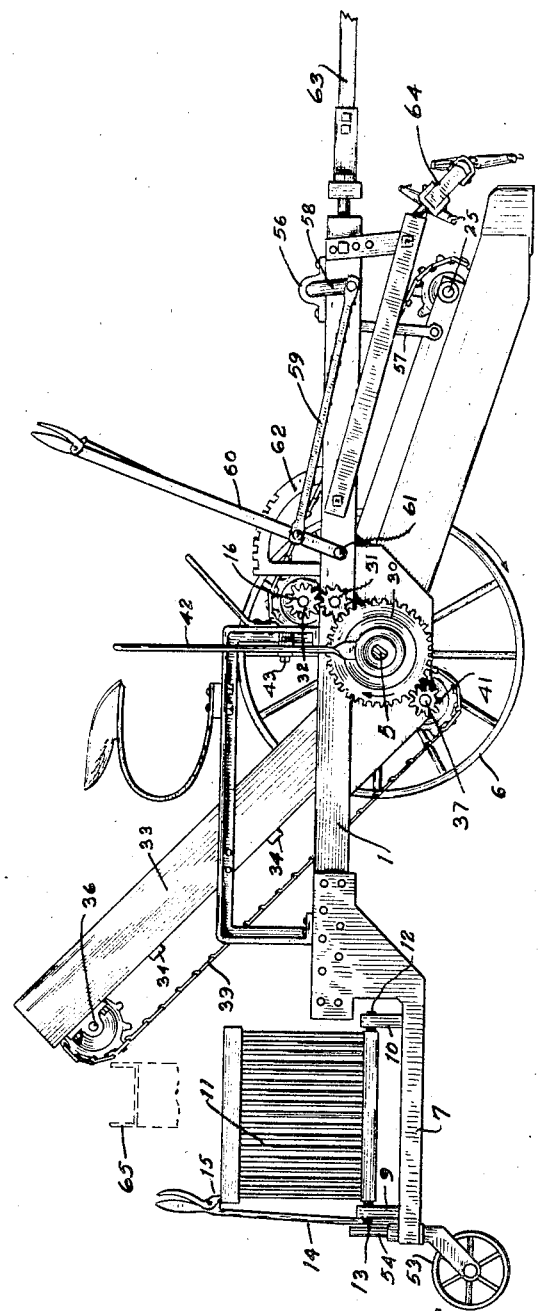

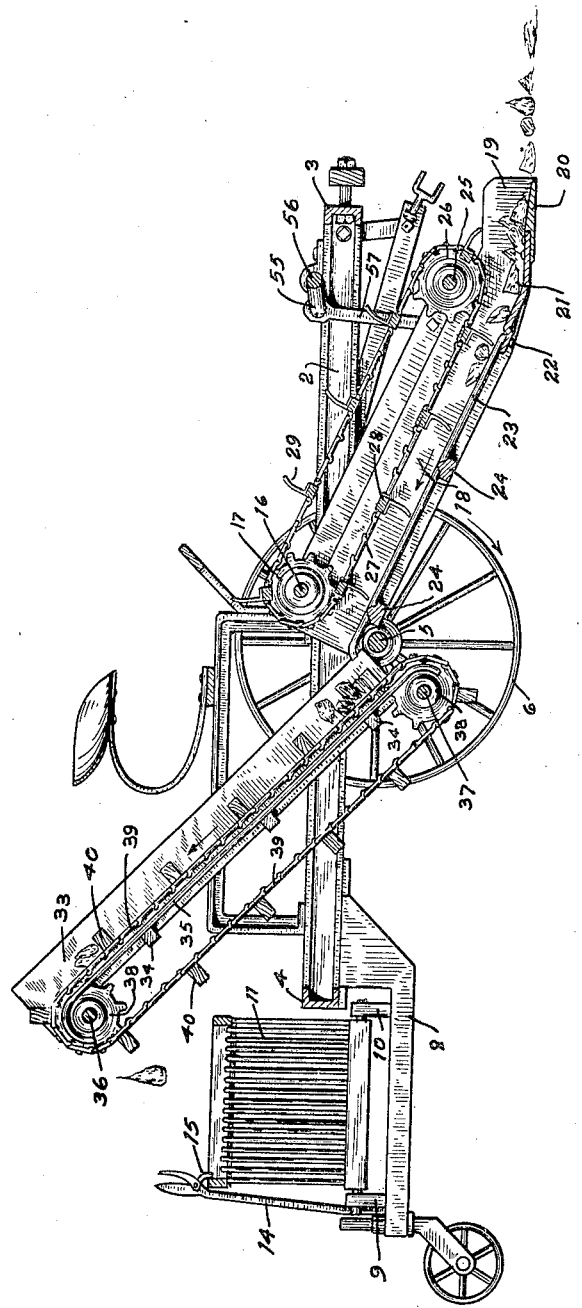

1,522,007

UNITED STATES PATENT OFFICE.

WILLIAM GARNER, OF LONGMONT, AND FAY GARNER, OF ERIE, COLORADO.

BEET LOADER.

Application filed March 25, 1924. Serial No. 701,694.

*To all whom it may concern:*

Be it known that we, WILLIAM GARNER and FAY GARNER, citizens of the United States, residing, respectively, at Longmont, county of Boulder, State of Colorado, and Erie, county of Weld, and State of Colorado, have invented certain new and useful Improvements in Beet Loaders; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in loading machines and has special reference to a machine for loading beets, potatoes and similar articles.

In some parts of our country sugar beets are one of the main crops and are extensively raised. When the beets are harvested, they are first pulled, then topped and laid in rows across the field. It is now necessary to load the topped beets onto trucks for the purpose of hauling them into the beet dump at the railroad siding or at the factory. The loading of the beets is accomplished almost exclusively by the labor of men who shovel the beets from the ground and into the trucks. This is heavy, disagreeable work that increases the cost of production to a considerable extent. When beets are loaded from rows in the manner explained, the truck must always pass over soft ground, with the result that the load that can be pulled in the field is considerably smaller than the load than can be pulled along the hard road, and as a result, considerable time is wasted due to the fact that a trip is made from the field to the dump with a load considerably smaller than the capacity of the truck.

It is the object of the present invention to produce a machine that can be pulled along the rows of topped beets and which will engage the beets and elevate them into a dump box or directly into the body of the truck. Where the field is soft we contemplate placing a loading bin in the field and to transport the beets to the bin and elevate them into the same by means of the loading machine. The truck can drive up to the loading bin from which the beets may be transferred by gravity into the truck. In this manner the truck will always travel over the same path, which will soon become hard, and it will be possible to take a capacity load directly from the bin to the dump. By means of our loader, used in connection with a loader bin, we can gather and transport a much larger amount of beets in a given time with the same amount of help than when the present methods are employed.

Our improved loader can be most clearly described and will be most readily understood when reference is had to the accompanying drawings in which the preferred form thereof is illustrated, and in which:

Fig. 1 is a top plan view of our machine;

Fig. 2 is a side elevation of our machine with the near wheel removed;

Fig. 3 is a section taken on line 3—3, Fig. 1;

Fig. 4 is a detail; and

Fig. 5 is a section taken on line 5—5, Fig. 4.

Our improved beet loader consists of a framework comprising side members 1 and 2 and transverse end pieces 3 and 4. This frame is mounted on an axle 5, to the ends of which the drive-wheels 6 are secured. Attached to the rear end of the main frame is a second or auxiliary frame consisting of side pieces 7 and 8 and a rear transverse member 9, connected to members 7 and 8. An additional transverse member 10, similar to the member 9 spaced from and parallel to the latter, is also secured to 7 and 8. A crate 11 of V-shaped, transverse section is pivoted to members 9 and 10 at points 12 and 13. The crate 11 is held in horizontal position by means of upright bars 14, each of which is provided with a catch means 15 for engaging the upper edge of the crate. Rotatably mounted on sides 1 and 2 is a shaft 16 to which are secured sprocket wheels 17. Side pieces 18 of the chute, which will now be described, are pivotally attached, at a point near their upper ends, to the shaft 16. The forward ends of sides 18 are bent outwardly, as indicated by numerals 19 and are connected by a plate 20. A second plate 21 is connected to the rear edge of plate 20 and has its upper edge offset, as indicated at 22, to receive the lower ends of the spaced parallel bars 23 which form the bottom of the chute and which are supported on the transverse bars 24. A shaft 25 is mounted to rotate about an axis parallel to the axis of shaft 16. Shaft 25 carries two sprocket wheels 26 corresponding to the sprockets 17 on the shaft 16. Two endless sprocket chains 27 cooperate with the sprocket wheels 17 and 26. These chains are connected by transverse bars 28, each of which has secured to it a plurality of spaced fingers 29 whose ends extend into close proximity to the bars 23. Secured to the shaft 5 is a gear wheel 30 which meshes with an idler 31 which in turn meshes with the gear 32 on the shaft 16. When the machine is moved in a forward direction the wheels 6 will rotate in the direction of the arrow (Figs. 2 and 3). Since these wheels are secured to the axle 5 in such a manner that the latter will be rotated by them when the loader moves ahead, and since gear 30 is secured to the axle by means which causes it to rotate in unison therewith, it is evident that the conveyor comprising the sprocket chains 27 will be moved in the direction indicated by the arrow in Fig. 3 and that the fingers 29 will carry beets or any other article upwardly along the bars 23, and deposit them on the second conveyor. The second conveyor consists of sides 33 connected by transverse bars 34 which support the spaced parallel bars 35. Rotatably secured to the upper and lower ends, respectively, of sides 33 are shafts 36 and 37, each of which carries a pair of sprocket wheels 38. Cooperatively related to the sprocket wheels 38 are endless sprocket chains 39 which are connected at spaced intervals by parallel, transverse bars 40. From Fig. 2 it will be seen that shaft 37 is provided with a gear wheel 41 which meshes with the gear 30. When the loader is pulled in a forward direction, the conveyor chains 39 more upwardly in the direction indicated by the arrow in Fig. 3. It is now apparent that when the loader is drawn over a field in which beets or potatoes are laid in rows, the latter will enter the lower end of the lower conveyor in the manner indicated in Fig. 3. They will then be engaged by the fingers 29, carried upwardly and dumped onto the upper conveyor which elevates them still higher and finally lets them drop into the container 11. When the latter is filled, the loader is thrown out of gear, by means which will be hereinafter described, and driven to a central dump where they are dumped by the simple action of releasing the container 11 and allowing it to be rotated about its axis. It is our intention to provide a loading bin and means for elevating the beets into the bin. The bin shall be so constructed that the beets may be loaded by gravity onto a truck. As this bin involves a separate invention, we have not shown nor described the same in this application.

In Figs. 2 and 4 we have shown a lever 42 that is pivoted at 43 and has its lower end engaging in an annular groove 44 in a clutch collar 45. This collar is slidable on the shaft 5 and is held from rotation by the action of the key 46. The clutch member carries a pair of opposed lugs 47 that engage corresponding notches 48 in the hub 49 of the gear 30 (Fig. 4). The hub 50 of each wheel is provided with interior ratchet teeth 51 (Fig. 5) that cooperate with the pawl 52 that is carried by the shaft 5. When the machine is pulled in a forward direction, the notches and the pawls engage and the shaft 5 is rotated. When the wheels rotate in the opposite direction, as when the machine is moved in a backward direction, then the shaft 5 remains stationary. The pawl and ratchet mechanism also permit the machine to be turned. The mechanism illustrated is merely illustrative as any other well known pawl and ratchet devices may be used. By moving the clutch member 45 to the left (Fig. 4) until the lugs 47 disengage the notches 48, the machine is out of gear and the conveyors will remain stationary while it is pulled over the field. The rear end of the machine is provided with wheels 53 that are mounted so as to be movable about vertical spindles 54 and function in the manner of casters such as are used in connection with furniture.

In order to adjust the lower chute or conveyor, we have mounted a shaft 55 in bearings 56. The portion of the shaft intermediate the bearings is offset in the manner shown in Figs. 1 and 3. Links 57 connect the offset portion of the shaft 56 with the lower end of the conveyor in such a manner that when the shaft 5 is rotated, the conveyor is raised and lowered. For the purpose of rotating the shaft, we have provided one end thereof with a crank 58 (Fig. 2) which is connected by means of a rod 59 with a handle 60. This handle is pivoted at 61 to the frame member 1 and when it is moved backwardly, the shaft 5 will be rotated in a clockwise direction and thereby raise the front end of the conveyor. A quadrant 62 is provided for holding the lever in adjusted position.

A tongue 63 and equalizers 64 are provided when the loader is to be operated by horses.

If it should be found desirable to load the beets directly into trucks instead of into the container 11, a chute 65, indicated by dotted lines in Fig. 2, is provided. This chute extends over the truck box and conveys the beets directly to the truck.

The operation of our loader is as follows:—The beets, after they have been pulled and topped, are laid in parallel rows. The loader is then driven along the rows with the forward end of the lower chute moving in the direction of the rows. The beets, as they enter the conveyor, are engaged by the fingers 29 and are carried upwardly and deposited on the second conveyor which carries them up and dumps them into the container 11. When this is full, the machine is thrown out of gear and driven to the loading bin where the beets are dumped out and elevated into the bin. This is repeated each time the container 11 is filled.

By the use of our machine, one of the most disagreeable tasks connected with the raising of sugar beets is removed from the realm of manual labor to machine labor with a great saving of expense.

Having now described our invention, what we claim as new is:

1. A loading machine comprising, in combination, a framework, a pair of wheels attached thereto for supporting the same, a conveyor chute pivotally attached to the framework, said chute being inclined downwardly and forwardly with respect to the framework and its normal direction of movement, the bottom of said chute being formed by parallel spaced bars, an endless conveyor belt operatively associated with the chute, said conveyor belt being located entirely above the bottom of the chute and provided with spaced rows of outwardly extending fingers that project toward the bottom of the chute from the side of the conveyor nearest thereto, means for adjusting the inclination of the chute with respect to the frame, and means for transferring motion from the wheels to the conveyor.

2. A loading machine comprising, in combination, a framework, a pair of wheels attached thereto for supporting the same, a conveyor chute pivotally attached to the framework, said chute being inclined downwardly and forwardly with respect to the framework and its normal direction of movement, the bottom of said chute being formed by parallel spaced bars, an endless conveyor belt operatively associated with the chute, said conveyor belt being located entirely above the bottom of the chute and provided with spaced rows of outwardly extending fingers that project toward the bottom of the chute from the side of the conveyor nearest thereto, means for adjusting the inclination of the chute with respect to the frame, a second chute secured to the framework and extending upwardly and rearwardly therefrom, the lower end of said second chute projecting below the upper end of the first mentioned chute, the bottom of the second chute being formed from parallel spaced bars, an endless conveyor belt encircling the bottom of the last-named chute, and means for transferring motion from the wheels to the conveyors whereby the latter will be set in motion when the wheels are rotated.

3. A loading machine comprising, in combination, a framework, a pair of wheels attached thereto for supporting the same, a conveyor chute pivotally attached to the framework, said chute being inclined downwardly and forwardly with respect to the framework and its normal direction of movement, the bottom of said chute being formed by parallel spaced bars, an endless conveyor belt operatively associated with the chute, said conveyor belt being located entirely above the bottom of the chute and provided with spaced rows of outwardly extending fingers that project toward the bottom of the chute from the side of the conveyor nearest thereto, means for adjusting the inclination of the chute with respect to the frame, a second chute secured to the framework and extending upwardly and rearwardly therefrom, the lower end of said second chute projecting below the upper end of the first-mentioned chute, the bottom of the second chute being formed from parallel spaced bars, an endless conveyor belt encircling the bottom of the last-named chute, a receiving container pivotally mounted on the framework underneath the end of the second conveyor, means for holding said container against tilting, and means for transferring motion from the wheels to the conveyors whereby the latter will be caused to operate when the wheels are rotated.

In testimony whereof we affix our signatures.

WILLIAM GARNER.
FAY GARNER.